United States Patent [19]

Williams

[11] 3,768,078

[45] Oct. 23, 1973

[54] ENCODE SELECTOR SYSTEM

[76] Inventor: Richard M. Williams, 36571 Marler, Livonia, Mich. 48154

[22] Filed: Aug. 31, 1970

[21] Appl. No.: 68,135

[52] U.S. Cl. .............................................. 340/172.5
[51] Int. Cl. ......................... G11b 27/00, G11b 3/00
[58] Field of Search .................................. 340/172.5

[56] References Cited

UNITED STATES PATENTS

| | | | |
|---|---|---|---|
| 3,533,076 | 10/1970 | Perkins | 340/172.5 |
| 3,302,189 | 1/1967 | Korkowski | 340/172.5 |
| 3,315,235 | 4/1967 | Carnevale | 340/172.5 |
| 3,341,819 | 9/1967 | Emerson | 340/172.5 |
| 3,360,781 | 12/1967 | Boehnke | 340/172.5 |
| 3,564,508 | 2/1971 | Loewenthal et al. | 340/172.5 |
| 3,533,078 | 10/1970 | Perkins et al. | 340/172.5 |

OTHER PUBLICATIONS

Burroughs Series L2000 Electronic Billing Computer, January, 1969.

*Primary Examiner*—Gareth D. Shaw
*Attorney*—Kenneth L. Miller and Edwin W. Uren

[57] ABSTRACT

An operator selectable encode program system for encoding any combination of a plurality of data fields on a given document. In the preferred emboidment, there is shown a system for selecting the fields to be encoded from a bank of five operator activated selectors. Means is also provided for storing in an auxiliary memory, data which is commonly used and thereby relieving the operator of the necessity of keying such data into the system. The input to the system is a keyboard which is selectably used as a data entering device and also as a memory addressing device. The fields to be encoded are initially selected by the operator and processed by the encoder in a predetermined sequence. As each field is presented for data entry, an indicator is illuminated to notify the operator which one of the selected fields is ready for processing.

10 Claims, 10 Drawing Figures

INVENTOR.
RICHARD M. WILLIAMS
BY Russel C. Wells
ATTORNEY

| | 1 | 2 | 4 |
|---|---|---|---|
| AX | 0 | 1 | 1 |
| AN | 0 | 0 | 1 |
| RT | 1 | 0 | 1 |
| TC | 1 | 1 | 1 |
| AMT | 0 | 0 | 0 |

ENCODE SELECTOR SYSTEM

BACKGROUND OF THE INVENTION

1. Field of the Invention

This invention relates to programmable systems in general and more particularly to a programmable system wherein the operator of the system has the capabilities to instantly select the program desired.

2. Description of the Prior Art

Prior art programming systems commonly used on accounting equipment utilized a fixed, hard wired program board changeable only by a serviceman. In such systems, once a machine is programmed, the operator can not handle any operation which does not fall within the prewired program.

It is a principal object of the invention to instantaneously select one of a plurality of programmable routines for controlling the operation of document encoder.

It is another object of the invention to store a plurality of entries which are individually addressable by merely indexing their address on a keyboard which is normally used for data entry.

It is still another object of the invention to provide a keyboard which is responsive to the depression of the data keys thereon for repeating data previously entered, addressing a stored memory for new data or for causing the entry therefrom of original data.

SUMMARY OF INVENTION

In accordance with the objects above enumerated and with other objects which will become apparent, there is disclosed a program selection system for use in a document encoder. Data is entered into the system of the document encoder through a plurality of data entering keys positioned on a keyboard. Also included on the keyboard is at least one operational key for initiating the operation of document encoder. Positioned adjacent to the keyboard are a plurality of operator activating program selectors each movable between a normal or off position and a selected or on position. In the preferred embodiment there are five operator-activating program selectors. A plurality of addressable storage registers contained within a storage means such as memory unit, are respectively coupled to said operator-activating program selectors for receiving the data entered into said document encoder through the keyboard. In order to synchronize the transfer of data from the keyboard to addressed storage register, a program controller is provided which is responsive to the operational key. The program controller sequentially synchronizes the addressing of the storage register with the selected selectors.

In addition to the above program selection system, there is additionally provided an indicator lamp with each operator-activated selector. Whenever a selector is in its selected position, and the program controller is synchronized with the selector, the indicator lamp is illuminated.

In a particular embodiment, the program controller is a counter which counts upon each depression of the operation key. The number of counts generated from each depression depends upon the program selected. When the counter output is synchronized with the selected selectors, the information entered into the keyboard is transferred to the addressed storage register.

DETAILED DESCRIPTION

Figure 1:
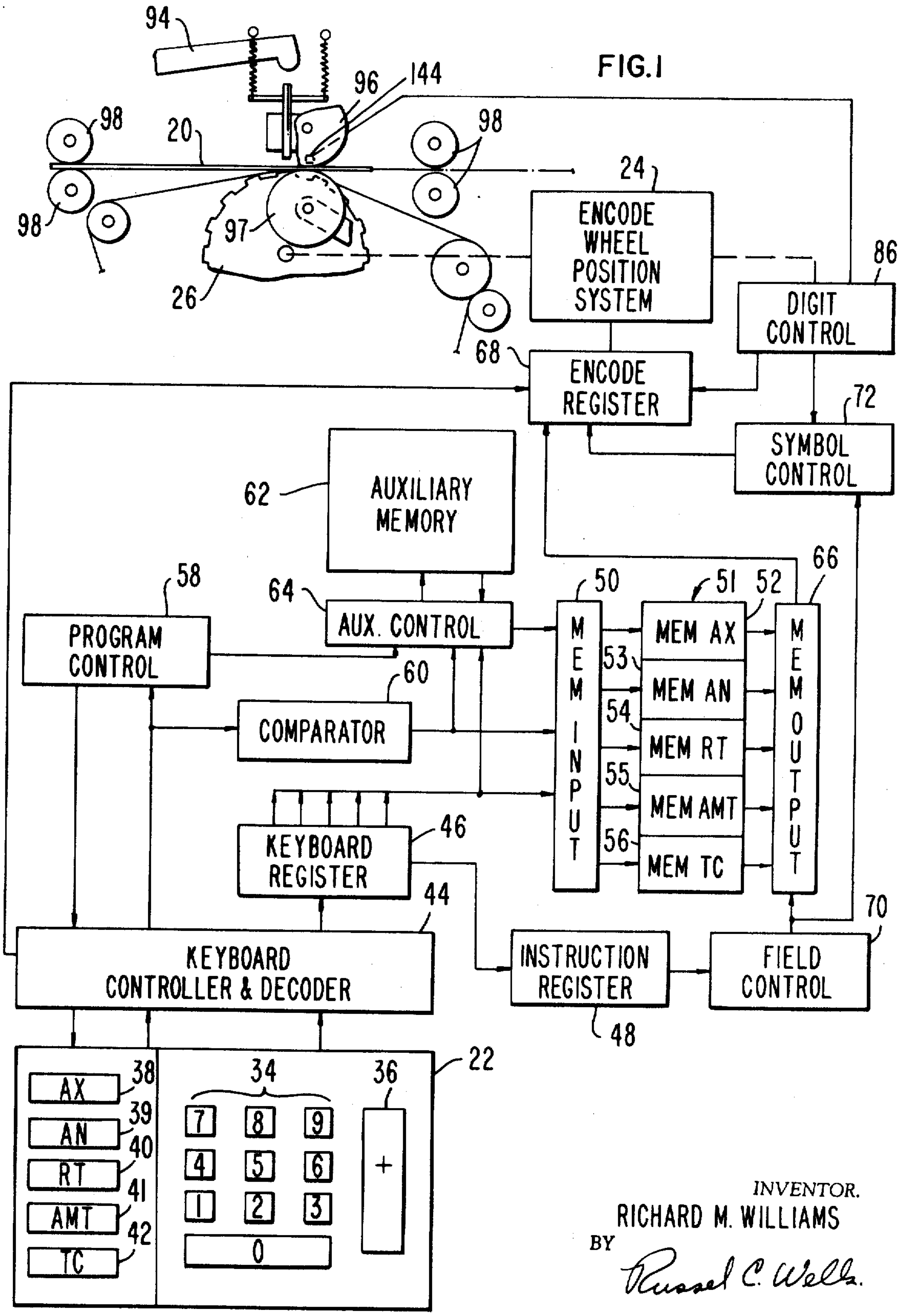
FIG. 1 is a block schematic diagram of a program system for controlling a document encoding apparatus.

Referring to the figures by characters of reference, there is illustrated in FIG. 1 a block diagrammatic schematic of a program selection system as may be used in a document encoding system. The data to be encoded upon the document 20 is entered into the keyboard 22 and processed through the system to the encode wheel positioning system 24 wherein the encode wheel 26 is positioned according to the data entered into the keyboard 22. The encode wheel position system may be the system as shown in U.S. Pat. No. 3,573,593, "A Servo System for Motor," by Jack Beery, and assigned to the same assignee as this invention.

Figures 2, 3:
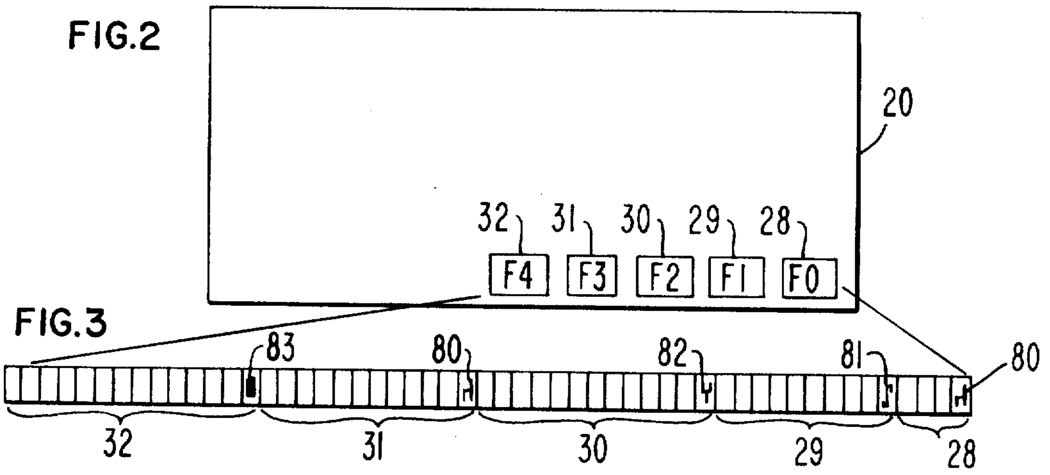
FIG. 2 is a plan view of a document.
FIG. 3 is an enlarged view of the printing field of the document of FIG. 2.

The program selection system to be described herein may be used to encode amount information on documents such as checks in either the MICR characters or the OCR characters of print. In such a use, there are several fields of print generally positioned in line along or near the bottom of the document 20. As illustrated in FIG. 2 there is shown a document 20 having five such fields of information. Reading the document of FIG. 2 and the enlargement of FIG. 3 from right to left, the first field 28 is the transaction code or TC field which is typically four characters long and identifies the type of document being processed. The second field 29 is the routing or RT field which is typically ten characters long containing information for the processing of the document through the complex financial system. The third field 30 is the amount or AMT field which is typically 13 characters long containing the money amount on the document. The fourth field 31 which is the account number field or AN field which is 12 characters long containing the account number of the payee or the account on which the check is drawn. The fifth field 32 which is the ON-US or AX field which is typically 14 characters long containing information peculiar to the originating bank. Depending upon the manner in which the document 20 is to be used, these fields may contain other information or be in any other order. In other industries, other than banking industries, the field contents may be different. The programming system to be described provides a means of encoding any one or all of the above identified fields according to selections made by the operator operating the encoding equipment.

Referring to FIG. 1 there is shown a keyboard comprising ten data entering keys 34, namely zero through nine and at least one operational key 36 which will hereinafter be referred to as the "go-bar." Since this system is basically dealing with numerical information, there is illustrated a numerical keyboard although alphabetic information could be entered also with the appropriate keyboard and encode wheel. Positioned adjacent to the keyboard 22 are a plurality of program select keys 38–42 or printing field selectors which will be used to select the above identified printing fields, and in particular there are five keys. Each of these keys correspond to the fields 28–32 to be encoded on the document 20. In the preferred embodiment, the positioning of these selectors reading from top to bottom are the AX selector 38, the AN selector 39, the RT selector 40, the AMT selector 41 and the TC selector 42. These selectors correspond to the above previously identified fields. When any key or selector is depressed or activated by the operator, the keyboard decoder 44 decodes the signals generated by the depressed keys into operational signals for operation in the system.

Each data key 34 and program selector 38–42 has an unique five bit code which is generated in the decoder 44 and is gated to the keyboard register 46. The five bit code comprises the binary bits one, two, four, eight and 16 with the first 10 combinations from zero through nine representing data information. The operational keys 36 and program selector keys 38–42 are represented by the presence of a 16 bit in the code and in the data or numerical information, the 16 bit is equivalent to zero. If in the keyboard register 46, the 16 bit is active, the code is transferred to the instruction register 48. All data information is transferred from the keyboard register 46 through the memory input 50 to one of a plurality of additional storage registers 52–56 in the memory. The data entered into the keyboard 22 is stored into the addressable storage registers corresponding to the present activated selector key 38–42. Thus, AX information entered into the keyboard will go into the AX register 52 of the memory 51; likewise the TC information will go into the TC register 56 of the memory.

Program selector keys 38–42 are addressable in a predetermined sequence and for the purposes of illustration, the sequence will be AX, AN, RT, TC and AMT. However, since these are program selectors and each selector has a normal position and a selected position, any combination of the selector keys may be programmed for encoding. Once the selector keys are moved to their selected position, the program control unit 58, FIGS. 5 and 6, functioning through the keyboard 22 and in response to the selector keys 38–42 function to synchronize the addressing of the appropriate storage register 52–56 in the memory 51 with the proper selected program selector. When the signal from the program control unit 58 agrees with the selector keys a signal is generated in the comparator 60 to address memory 51.

In certain applications, some fields such as the AX field or the RT field 29 may contain information which is a fixed number. For example, there may be several different routings, each identifiable by unique number. In such an application it may be expedient to store the several unique numbers into a non-destructive memory such as the auxiliary memory 62. Then, at the appropriate time under the control of the program control 58 and the selector keys 38–42 and the operator is required to enter the RT information, the operator need only address the auxiliary memory 62. The information for the auxiliary memory is then transferred into the RT storage register 54 for encoding. In this application, the keyboard 22 and in particular the data keys 34 also function as memory address keys. Typically, there may be 100 words of the auxiliary memory which are addressable from 00 to 99. In such a situation, only two digits need to be entered into the keyboard 22 followed by depression of the operational key 36 and through the keyboard decoder and the program control, a particular word is addressed in the auxiliary memory 62 for transfer to the appropriate storage register 52–56. The addressing of the auxiliary memory and the transfer of information therefrom is under the control of an auxiliary control means 64, receiving inputs from the program control, the comparator and the keyboard register.

In the system illustrated, encoding is a digit by digit operation. The information is withdrawn from the memory 51 and in particular the selected storage registers through the memory output 66 and is transferred digit by digit to the encode register 68. From the encode register 68 each digit is used to position the encode wheel 26. Since this system has the capabilities of encoding only selected fields on the document 20, the withdrawal of information from the memory is under the control of the field control unit 70 which is basically a counter. The fields thus selected by the selector keys 38–42 are stored in the instruction register 48 and the field control unit 70 cooperating with the instruction register 48 controls the memory output 66.

Figure 4:
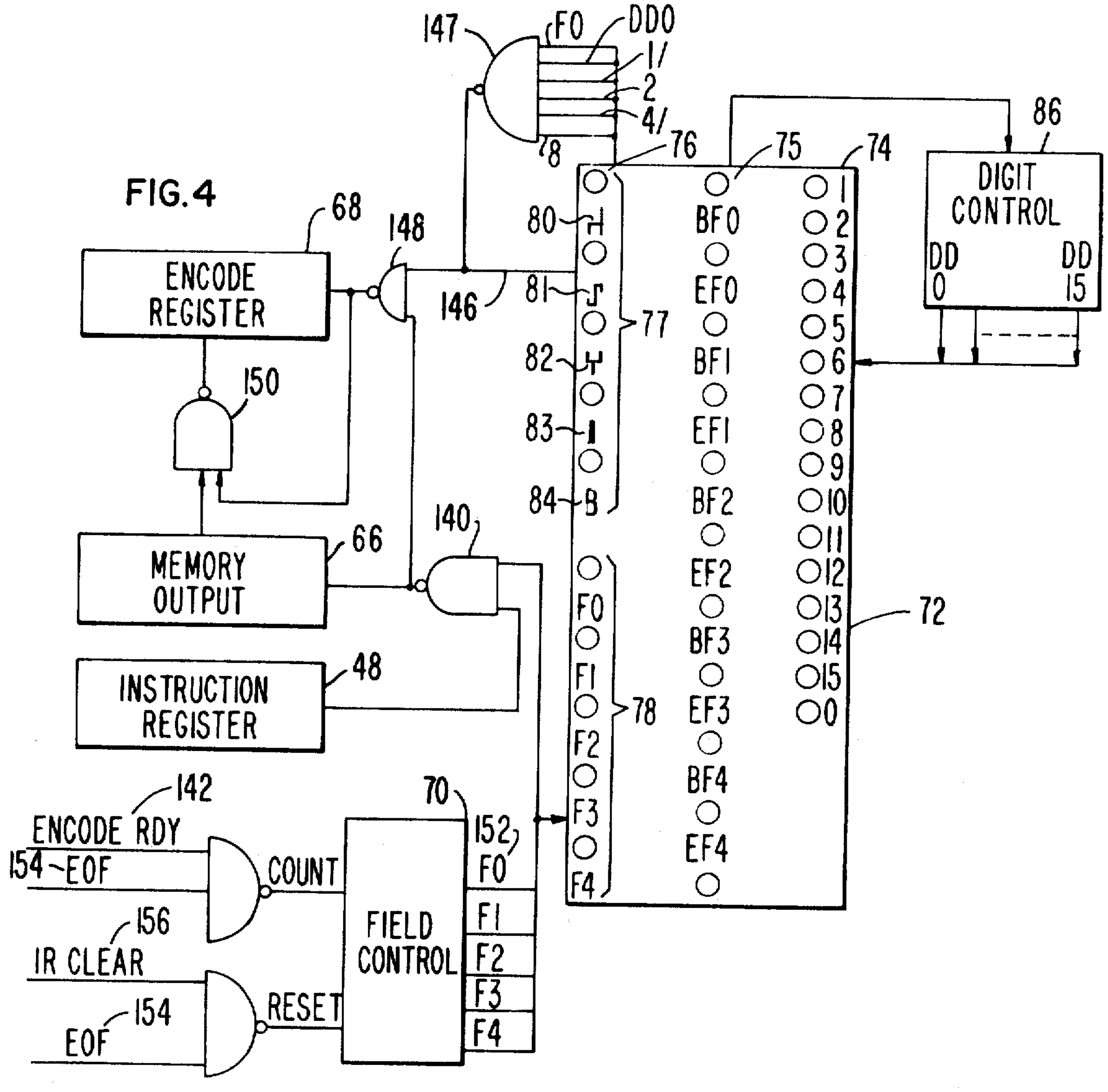
FIG. 4 is a block schematic of the field and symbol control units of the system of FIG. 1.

In the document format as illustrated in FIG. 2, the boundaries of each field may be delineated by certain special symbols including blanks from a symbol control unit 72. The special symbols are typically controlled by such means as a patchboard 72 as shown in FIG. 4. As illustrated the patchboard comprises three columns 74–76 with the rightmost column 74 corresponding to the number of digits possible in a field, from digit 0 through ditit 15. The middle column 75 has a plurality of connections respectively corresponding to the beginning and ending of the several fields 28–32. The first two connections correspond to beginning of field zero BFO, and the end of field zero EFO. The third column 76 is broken into two sections 77–78 with the uppermost section 77 containing a plurality of special symbols and the lowermost section 78 containing connections representing each field. For example, if the beginning of field zero begins with the digit zero and contains the first symbol 80, a wire would be connected between digit zero, BFO, and the first symbol 80. Likewise, if the field zero was only four digits long and the end of the field was a blank, a wire would be connected between digit three, EFO, and B 84. In a similar manner if in field one, the seventh digit was a blank then a wire would be connected between F1, digit 6 and B 84. The output of this patchboard in a given field which is being encoded overrides the output from the memory output 66 and in place of a digit from the memory the output of the patchboard 72 would be connected to the encode register 68.

The field control unit 70 or counter does not begin functioning until the document is in position for encoding. The counter is then reset when the document has completed the encoding of the end of field four. If a field was not to be encoded, then the selector program key 38–42 would be in its normal position and the output of the instruction register 48 would indicate not encode. In such a condition, the field counter 70 will be stepped through the field under the control of the digit control 86 and effectively put in all blanks within the field. Thus, all five fields are processed through the encode program and are presented for encoding to the encode wheel if the fifth field is to be encoded.

Figures 9, 10:
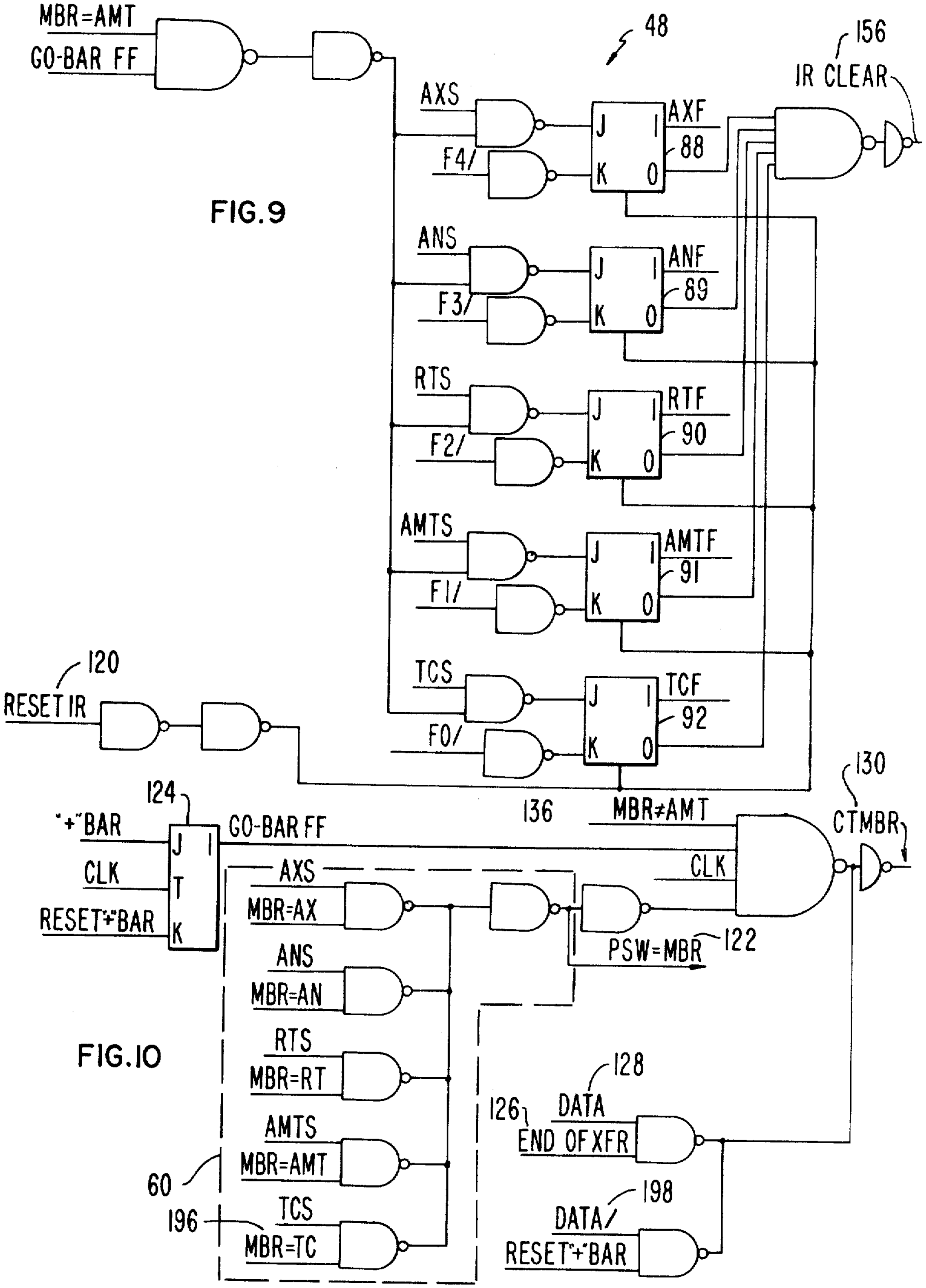
FIG. 9 is a schematic of the instruction register of FIG. 1.
FIG. 10 is a schematic showing the comparator of FIG. 1.

As shown in FIG. 9, the instruction register 48 comprises a plurality of flip flops 88–92 one each for each of the selector keys. Since the environment of the preferred embodiment of the system is a banking operation, the last operation to be entered into the machine when encoding a document is the amount. Once the amount is entered the encoding operation will soon take place. At that time after the amount is entered and the "go-bar" is depressed the status of the selector keys 38–42 is transferred to the instruction register 48 for storage during encoding After the instruction register is loaded the operator is allowed to begin preparing for the encoding of the next document and even to the extent of changing the programming for the next document. As each field is encoded, the corresponding instruction register is reset.

OPERATION

Figures 5, 6, 7:
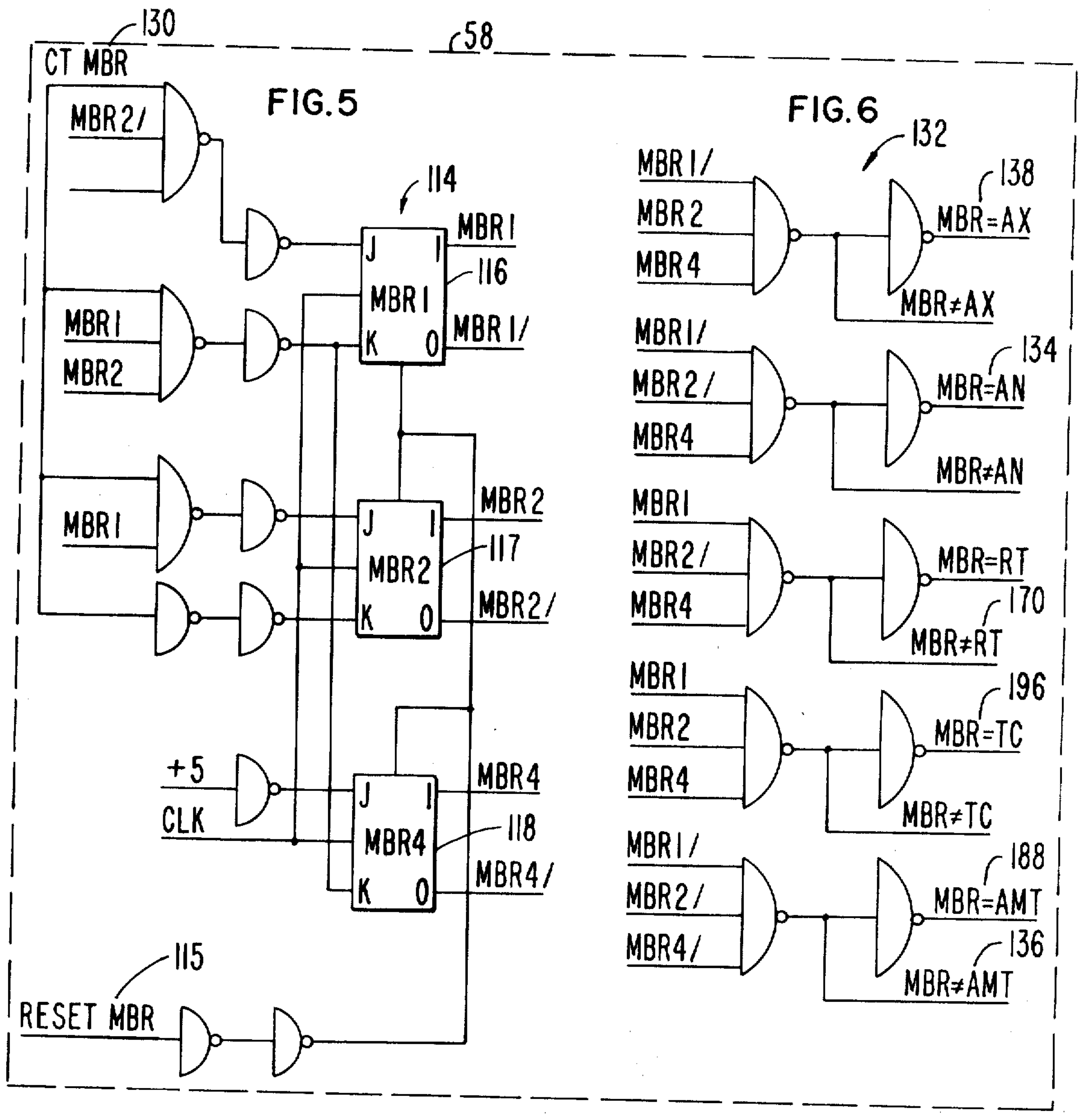
FIGS. 5 and 6 are schematics of the program control unit of FIG. 1.
FIG. 7 is a state chart of the counter of FIG. 5.

In the preferred embodiment, the encoder is an operator-attended piece of equipment. The information to be encoded upon the document 20 is entered into the system from the keyboard 22. As previously mentioned there is a predetermined sequence of information entries, which sequence is illustrated in FIG. 7. Depending upon whether or not a program select key has been positioned at a selected position, the operator may omit entering data information for a particular field. Thus, an operator may enter information in each of the five fields 28–32 or may only enter information concerning, for instance, the account number and the amount field. If it is desired to enter information only to the account field 31 and the amount field 30 the sequence would be the account number first and then the amount would be entered into the keyboard. At the conclusion of entering data into the numerical keys 34, the operational key 36 or code bar is depressed causing the keyboard to be decoded and the information loaded into the keyboard register 46. Subsequent to the depression of the operational key and prior to the transfer of the information from the keyboard decoded to the keyboard register, a comparison is made between the selected program keys 38–42 and the program control unit 58 for the correct routing of information from the keyboard to the memory.

For ease of description there will be described a basic document entry and encoding all of the fields on a document 20 and in addition thereto several variations of document encoding. At a time prior to the time of encoding, the document is positioned between the encode hammer 94 and the encode wheel 26 for encoding. As illustrated in FIG. 1, the document 20 is located and held in the encode position prior to encoding by a pair of pinched rollers 96–97. One of the pinched rollers is a drive roller 96 and the other pinched roller is a driven roller 97 and are so positioned in contact with one another that when the drive roller is not rotating a document 20 cannot pass between the two rollers. This serves as a limit to the progress of the document through the encoding station. When the drive roller 96 begins to rotate, it rotates at a constant speed such that the encoding of the document is accomplished while the document is constantly moving. This speed is typically much slower than the speed of the several pairs of high speed rollers 98 which bring the document into and take the document 20 away from the encoding station. In each of the hereinafter operations upon completion of the encoding of data on the document 20, the pinched rollers 96 and 97 are released from contact with the document and the high speed rollers 98 move the document away from the encoding station.

For a basic operation, all of the fields on the document shown in FIG. 2 will contain data and each field will also be delineated by an appropriate symbol at each end. Field zero 28, which is the TC field, will begin at column one with the first symbol 80, a chair, encoded in column one. Field zero will end at column four with a blank which is indicated by a B 84 on the plugboard. Field one 29 will begin at column one with the second symbol 81, a hook, and will end with a blank symbol B 84, at column 10. Field two 30 which is the amount field will begin with the third symbol 82, a fork, and will begin at column one and will end with a blank, symbol number B, at column 13. Field three 31 which is the account number will begin with a first symbol, a chair 80, at column one and will end with a blank at column 12. Field four 32 will begin with the fourth symbol 83, a wide vertical bar, at column one and will end at column 14. Another criteria will be that all of the fields will have zero fill to the left. All of the selector keys 38–42 adjacent to the keyboard 22 will be positioned in their selected positions which will be indicated in FIG. 8, by having each of the switches 100–104 actuated to a closed position.

The logic to be used in the several schematic diagrams basically employs NAND gates wherein the output is true if any one or more of the inputs are false. All flip flops will be considered to be J-K flip flops and will all be negative triggering flip flops. A negative triggering signal is defined as a signal going from a positive voltage condition to a voltage condition which is more negative. On all J-K flip flops having a signal connected to the trigger input, the switching of the flip flop will be controlled by the trigger signal.

Figure 8:
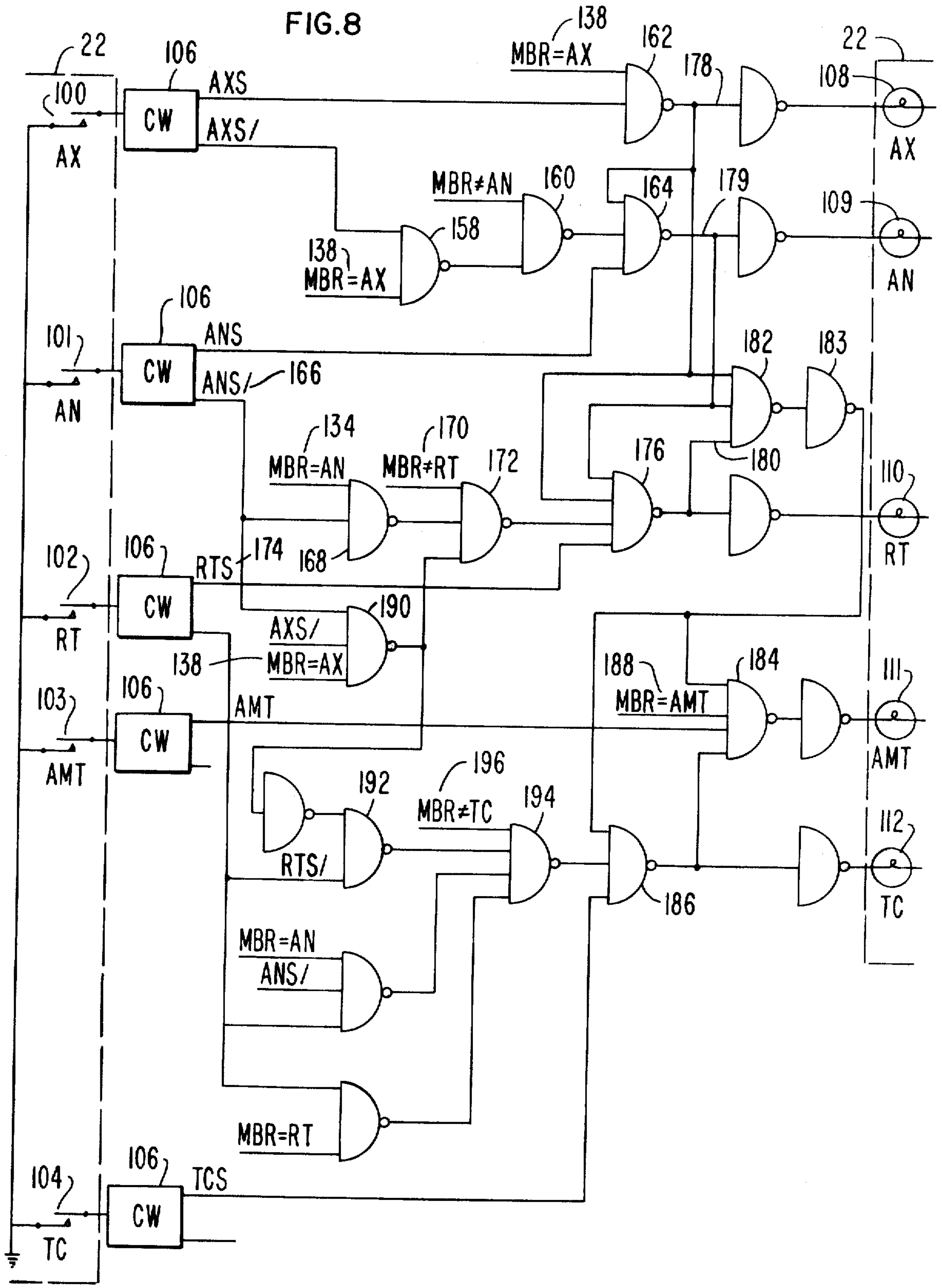
FIG. 8 is a schematic of lamp control of the system of FIG. 1.

The output of each of the switches shown in FIG. 8 is gated to a contact wetter circuit 106 which generates a false output when the corresponding switch is opened and a true output when the corresponding switch is closed.

Normal condition of the keyboard 22 prior to this basic operation would have the indicator 108 connected to the AX selector key 38 illuminated. This indicates to the operator that the first data entry which will be made will be in the ON-US field. Since this field has been previously defined as having 14 columns, therefore, the operator can enter up to 13 digits with the 14th column being a symbol or the wide vertical bar 83. As the operator depresses one of the data keys 38, the key is decoded by the keyboard decoder 44 and is stored into one of the stages of the keyboard register 46. Each key, as it is entered, is then stored into an adjacent register of the keyboard register 46 until all of the data has been entered.

At this time, all systems are reset and the motor bar register 114 in the program control unit 58 is set to agree with the chart of FIG. 7. This is accomplished by applying the RESET MBR signal 115 to the power reset and set terminals of the several registers 116–118 causing the MBR 1 flip flop 116 to be reset and the MBR 2 117 and MBR 4 118 flip flops to be set. The instruction register 48 comprising the five instruction flip flops 88–92 are all reset by the application of the RESET IR 120 signal applied to the reset terminal of each flip flop. Both of these signals includes a power-on signal for initializing all the systems.

After entering all of the data, the operator depresses the go-bar or operational bar 36 and the program control unit 58 is gated against the status of the selector keys 38–42 in the comparator 60. The status of the program control unit agrees with the condition of the selected key and a signal PSW = MBR 122 is generated out of the comparator 60. This signal is applied to the memory input 50 and to the control unit 64 for the auxiliary memory 62. The signal output from the comparator 60 addresses the proper storage register 52–56 in the memory 51 and then controls the unloading of the keyboard register 46 into the addressed storage register. The information just previously entered into the keyboard 22 will be stored in the storage register identified as MEM AX 52. The go-bar or operational key 36 is restored immediately after depression which restores the go-bar flip flop 124 to its natural state. At the end of the transfer of information from the keyboard register 46 to the addressable storage register in the memory 51, a signal 126 indicating the end of the transfer is generated. This signal 126 is gated with a signal 128 indicating that data has been entered into the keyboard to count the motor bar register 114 one count. The signal generated is CT MBR 130 which is applied to the K input of the MBR 2 flip flop 117 resetting that flip flop.

The output of the program control 58 is decoded and the signal MBR = AN 134 is generated. This signal is applied to several gates in FIG. 8 and coupled with the negation of the signal, the AX indicator 108 is turned off and the AN indicator 109 is turned on.

At this time the AN indicator 109 being lit, the operator will enter the data corresponding to the account number of the document 20 she is processing. In the similar manner described above, upon depression of the operational key 36 or go-bar the information will be transferred from the keyboard register 46 into the AN storage register 53 in memory. At the completion of the transfer, the MBR register 114 is counted once again, resulting in the RT indicator 110 being illuminated.

The operator enters the correct data for the routing information, depresses the go-bar transferring the data from the keyboard register 46 into the RT storage register 54 of the memory. At the end of the transfer, the MBR register 114 is counted again and the TC lamp 112 is illuminated. It has previously been defined that the last operation will be an amount operation due to the probability of arithmetic operations being necessary to process the amount information. At the conclusion of the TC operation, the data is transferred from the keyboard register into the TC storage register 56 in the memory and the MBR register 114 is counted once more which results in all four flip flops being reset. When this happens, the amount light 111 will be illuminated.

Since after entering the amount data into the keyboard 22, the next operation is the encoding of the information on the several fields of the document 20. The amount information from the keyboard 22 is transferred from the keyboard register 46 to the AMT storage register 55 in memory. The MBR register in the program control unit 58 is not counted at this time due to the false condition of the signal MBR ≠ AMT 136. The instruction register 48 is now set indicating which selector keys were activated by gating the output of each switch 100–104 to the J input of the several flip flops 88–92 of the instruction register. By storing each switch in the instruction register, this will permit the operator to change the program if necessary for the next document while the present document is being encoded. After the instruction register is loaded, then the MBR register will be reset to indicate the MBR = AX 138 condition.

Encoding of the data on the document 20 is a digit by digit encode operation and is under the control of the digit control unit 86, the symbol control unit 72 and the field control unit 70. The field control unit 70 is basically a ripple counter which counts from zero through four and resets. The symbol control unit 72 in the preferred embodiment is basically the patchboard shown in FIG. 4 and the digit control unit 86 is a plurality of flip flops arranged in a ripple counter to count digit positions from zero through and including digit 15. It is basically a four flip flop counter which is decoded in a binary to decimal decoder generating 16 unique digit position outputs, DD0 through DD15.

The output of the instruction register 48 and the output of the field control unit 70 are gated together to NAND gate 140 to control the memory output 66. When the document 20 is ready to be encoded, an encode ready signal 142 is generated which performs the function of allowing the field counter 70 to count and also connects the drive to the drive pinch roller 96. An indication means such as a solar cell 144 indicates the movement of the document 20 through the encode station. When the solar cell 144 is tripped by the leading edge of the document, the digit control unit 86 will start functioning. The digit control unit which is synchronized with the rotational drive of the pinch rollers will begin counting and when the DD0 signal is logically true, the symbol output 146 and in particular 147 is activated from the patchboard 72. Since the encode wheel 26 of the position system 24 is responsive to a binary encoded symbol, the first symbol 80 or the chair from the patchboard is encoded in the patchboard into a binary signal comprising values of the binary 1/, 2, 4/ and 8 bits. These four bits are gated from the patchboard into the encode register 68 which is a single digit register.

As previously mentioned the outputs of the patchboard preempt the output from the memory 51 as illustrated in the logic by NAND gates 148 and 150 of FIG. 4. In the example being described, the first field 28 is a TC field and in the instruction register 48 the TC flip flop 92 is true and the F. signal 152 from the field control 70 is true. These two signals are gated together in NAND gate 140 and are supplied to the memory output control unit 66 and to the symbol output control gate 148 of the symbol control unit 72. Since the symbol line 146 is logically true, the information will be gated from the patchboard 72 into the encode register 68, and the information from the memory output will be inhibited. The encode register 68 receives information from the patchboard 72 corresponding this columnar position and the memory 51 is neither disregarded or stepped. Therefore, the last digit entered into the keyboard 22 when TC field was entered still remains at the output of the memory output even though the symbol 80 has been loaded into the encode register 68. The information in the encode register is transferred to the encode wheel 26 by the encode wheel position system 24 causing the encode wheel to position at the proper character and initiate firing of the print hammer 94.

The pinch wheel drive roller 96 is constantly rotating, generating the timing signal to the digit control unit 86, stepping the control unit from DD0 to DD1. Since DD1 is not wired on the patchboard, the symbol output 146 is logically false and the memory output 66 is enabled and is gated to the encode register 68. This will continue until the digit control digit DD3, which is column 4, wherein the end of field zero is wired to a blank on the patchboard. When this symbol 84 is loaded into the encode register 68 which is basically a non-encode operation, the hammer 94 is inhibited from firing. The end of field signal 154 is gated to count the field counter 70 from field zero to field one.

In a similar manner the beginning symbol or the hook 81 of field one 29 is loaded into the encode register 68 with the patchboard being wired from DD0 to BF1 to the hook symbol. The routing information is loaded digit by digit from the memory 51 to the encode register 68 for encoding. All characters are encoded up to the column connected to the end of field one connector on the patchboard when the output of the patchboard pre-empts the output of the memory.

The encode operation continues through the five fields and at the end of field four 32, when the IR CLEAR signal 156 is true, the field counter is reset, the pinch rollers 96–97 are separated and the document is driven out of the encode area under control of the high speed rollers 98.

There has thus been described a basic operation for encoding a document with data in all five fields. Starting from such a basic operation and with the flexibility of the selector keys 38–42, variations of operations may be programmed in the encoder depending on the status of the selector keys. As previously mentioned, in the preferred operation of the encoder, the amount information is entered into the system last. For each of the following operational variations, the last operation of each variation will be the entering of the amount figure.

The first operational varation of the basic operation to be described will be one wherein the transaction code or TC, which is field zero 28 and the amount information field two 30, are the only data to be encoded on the document 20. In such an operation, referring to FIG. 1, only the lower two selector keys 41–42 are positioned in the selected position and the upper three selector keys 38, 39 and 40 are positioned in the non-selected position. This will cause the AMT 103 and TC 104 switch of FIG. 8 to be actuated. The description will begin with all systems reset and the MBR counter 132 set to the signal MBR = AX 138. However, with the AX 100, the AN 101, the RT 102 switches in the non-selected position and under the control of the logic of FIG. 8, the TC light 112 is illuminated.

With the AX switch nonactuated, the output of the contact wetter 106 has the AXS/ signal true which is gated against the MBR = AX 138 signal which is also true generating a false output out of that gate 158. That false output is applied to the next gate 160 which then generates a true output. The AXS signal is false which generates a true output out of the gate 162 following that signal which results in the AX light 108 being off. The AN switch 101 is open and the output of the contact wetter 106 ANS, is false causing the output of the following NAND gate 164 to be true and the AN light 109 is off. The ANS/ output 166 of the contact wetter is true which is gated against the signal MBR = AN 134 which is false. The output of that gate 168 is true which is gated against the MBR RT signal 170 which is true and the output of that gate is false 172. The RTS output 174 of the contact wetter for the routing switch 102 is false causing the output of the gate 176 to be true. This insures that the RT lamp 110 is not illuminated. The true control signals 178–180 which control the AN, the AX and the RT lamps are gated together through a double NAND gate 182–183 resulting in a true output which is applied to two NAND gates 184 and 186 controlling the amount lamp 111 and the TC lamp 112. To the NAND gate 184 controlling the amount lamp 111 the MBR = AMT 118 is false and the output of that gate therefore is true. To the NAND gate 186 controlling the TC lamp 112 the TC switch 104 is actuated the output of the TC contact wetter TCS is true. The output of the NAND gate 190 gating the ANS/ and the AXS/ and the MBR = AX 138 signals is false, which is inverted and becomes true and when gated against the signal RTS/, the output of that NAND gate 192 is false. This false signal becomes a true in NAND gate 194 which is applied to the control NAND gate 186 for the TC lamp. Since all three inputs of this gate 186 are true, and output of this gate is false and the TC lamp 112 is then lit.

After entering the TC data on the keyboard the operator depresses the operational key 36 and the program control unit 58 compares the status of the MBR counter 132 and the output of the selector key switches. Since they do not agree, the MBR register 114 is counted so the output of the MBR counter is set to MBR = AN. This comparison is again made and found to be false and the register is counted a second time so that the output MBR = RT is true. Since the RT switch 102 is not actuated the MBR register is counted a third time so that the output MBR = TC 196 is true. When the MBR = TC signal is generated and compared against the program selector keys, a comparison signal PSW = MBR 122, is generated which will control the transfer of data from the keyboard to the keyboard register to the MEMTC addressable storage register 56. After the transfer, the MBR register is counted again generating the MBR = AMT signal which will light the AMT light 111. As previously indicated the amount information is entered into the keyboard register 46 and into the memory 51 after which time the encoding operation will take place. The selector keys are then gated to the instruction register 48 and only the TC 92 and AMT 91 flip flops are set. Since these are equivalent to field zero 28 and field two 30 on a document, encoding will only take place in these two fields.

The encoding of field zero takes place as previously described and at the end of the encoding of field zero, the field counter is counted from field zero to field one. Since the instruction register 48 is not true for the RT signal, field one will not be encoded but the memory 51 will still be addressed. However, since the output of the field control unit does not indicate that all fields have been encoded, the document will proceed slowly through the encode station under the control of the pinch rollers 96 and 97. When the digit control unit 86 reaches the end of field one 29, the signal 154 is generated which will count the field counter to field two. Since this is the amount field, the encoding will take place as previously described.

At the end of the encoding of field two 30, the field two counter is reset and the output of the instruction register 48 indicates that all programmed fields have been encoded, and a signal is gated to the pinch rollers to separate the two rollers. The document 20 is then under the control of the high speed rollers 98 and the document is moved out of the encode station.

The above description could apply to any combination of selector keys 38–42 which may be actuated. It is noted that as soon as all of the encoding which is to be done has taken place, regardless of which field is the last field to be encoded, the document is again placed under the control of the high speed rollers 98 and removed from the encode station.

Another operational variation may well be where an amount previously entered into the system for the just previous document is to be repeated on the subsequent document. Such information is typically the routing information or the ON-US information. If, for example, the routing information is to remain constant on sequential documents the operator need only depress the operational key 36 when the RT lamp 110 is illuminated. Since no data has been entered into the numerical keyboard 22, a DATA/ signal 198 is generated in conjunction with the depression of the operational key which will inhibit transfer between the keyboard register 46 and the memory unit 51. Since there is no transfer, no information will be changed in the RT storage position MEMRT 54, but the depressing of the operational key will count the MBR register 114. The operation will then continue on through encoding as has previously been described with the previous amount already stored in the RT location being encoded on the document in field one.

Still another operation entails use of the auxiliary memory unit 62. Such a memory unit is typically a non-destructive memory having a plurality of addressable words therein. As previously indicated, such unit may have one hundred words of memory addressable from 00 through 99 and the information contained therein will be information which will be identified as constants. The document encoder may be placed in an environment wherein there are a plurality of routing codes which are frequently used. Also, there may be a plurality of ON-US codes which are frequently used. In such an operation instead of using the keyboard 22 to enter data information, the operator uses the keyboard to address the auxiliary memory 62 and the information is transferred from the auxiliary memory into the proper addressable storage register 52–56 in the memory 51. Auxiliary memory control 64 will be set to recognize only the conditions of the program control unit 58 where the RT 40 and the AN 39 selector keys are in the selected position.

To provide for the occasional operation when the data to be entered in the fields is not in the auxiliary memory 62 the keyboard 22 must then be used to enter new data into the system. In order to differentiate between a data entry in the keyboard and a memory address entry in the keyboard in such a situation, a counter, not shown, is provided in the auxiliary memory control 64 which counts the data depressions of the data keys 34 on the keyboard 22. The output of the counter will be zero, two, or a signal indicating more than two. If the output of the counter at this time equals zero indicates that the previously encoded information is information to be encoded and the contents of the addressable storage location should not be changed. If the output of the counter is equal to two, this will indicate that only two data keys 34 have been depressed on the keyboard indicating a memory address. Such a situation the keyboard decoder 44 is gated through the keyboard register 46 to the auxiliary memory control unit 64 to address the proper word of the auxiliary memory. Then under the control of the program control 58, the comparator 60 and memory input 50, the addressed word in the auxiliary memory is transferred to the appropriate storage register 52–56 in the memory. If the counter indicates that more than two keys have been depressed, this indicates that the information is different than what is in the auxiliary memory 62 and prohibits any transfer from the auxiliary memory. The information is then transferred from the keyboard through the decoder to the keyboard register and into the selected memory storage register. The encoding from such an operation is as has been described for other variations.

There has thus been described a program selection system for a document encoder utilizing a plurality of selector keys 38–42 positioned adjacent to the keyboard 22 of data entering keys 34. A program control unit 58 syncronizes the flow of data from the keyboard 22 into memory 51 according to the position of the selector keys. Encoding on the document 20 takes place in only these fields wherein the selector keys are active. There has also been described the use of an auxiliary memory 62 containing data information which is constant and provides means to relieve the operator from entering this constant data. Repeatability of data is provided by the depression of the operational key 36 without entering data information into the keyboard.

I claim:

1. In a document encoder for encoding a plurality of data fields in line on a document, a printing field control system comprising;

a keyboard having a plurality of data-entering keys and at least one operational key, a plurality of printing field selector keys adjacent said keyboard for selecting said data fields to be encoded, each of said selector keys having a normal position and an operator-activated position, and each one of said plurality of printing field selector keys corresponding to a particular one of said plurality of data fields, encoder memory means having a plurality of individually addressable storage registers for storing data entered into said keyboard, each one of said plurality of individually addressable storage registers being associated with a particular one of said plurality of printing field selector keys for addressing one of said plurality of storage registers in response to a corresponding one of said selector keys being in said operator-activated position, encoding means operatively coupled to said memory for selectively and serially encoding the data stored in said memory in each selected printing field on a document, and printing field control means responsive to said operational key and to said operator-activated field selector keys for sequentially addressing said storage registers according to a predetermined sequence and for controlling the flow of data information therefrom to said encoding means.

2. The field control system of claim 1 wherein said printing field control means includes instruction register means for storing information as to which of said printing field selector keys have been activated, counting means, and memory output means, said counting means being gated with said instruction register means for controlling said memory output means and transferring data information from said encoder memory means to said encoding means in said predetermined sequence.

3. The field control system of claim 2 wherein said system further includes a symbol control means responsive to said printing field control means for encoding predetermined symbol information at predetermined digit locations in said data fields regardless of the data stored in corresponding digit locations on said encoder memory.

4. In a document encoder, a printing field selector system comprising:

first storage means having a plurality of addressable storage registers, each location containing a predetermined quantum of data, a keyboard having a plurality of depressable data keys and at least one operational key, said data keys for entering data to be encoded on the document and for entering the address of one of said registers of said first storage means, a plurality of operator-controlled printing field selector keys adjacent said keyboard for selecting fields to be printed, said keys having a normal position and a selected position, and each one of said plurality of operator-controlled printing field selector keys corresponding to a particular one of said fields to be printed, keyboard decoding means responsive to said selected printing field selector keys for selectively decoding said depressed data keys as data or as the address of said storage register in said first storage means, second storage means having a plurality of addressable storage registers associated with said printing field selector keys and respectively addressed by said printing field selector keys for receiving data from said keyboard means or said first storage means, each of said plurality of addressable storage registers being associated with a particular one of said printing field selector keys, program controller means responsive to said operational key for synchronizing the addressing of said second storage means with said selected printing field selector keys, and encode means responsive to the data information stored in said second storage means for serially encoding the data stored therein on a document in field sequence according to the selected printing field selector keys.

5. A printing field selection system according to claim 4 wherein said keyboard decoding means includes a counter responsive to a predetermined fixed number of depressions of said data keys indicating that said data keys contain an address of a storage register of said first storage means and responsive to all other number of depressions of said data keys for indicating that said data keys contain data to be stored in said second storage means.

6. The printing field selection system according to claim 4 wherein said encode means includes:

means for indicating that said document is positioned for encoding, instruction register means for storing information as to which of said plurality of printing field selector keys were activated, and counter means responsive to said means for indicating that said document is positioned for encoding and gated with said instruction register means for stepping the data out of said second storage means in a predetermined sequence.

7. The printing field selection system of claim 6 wherein said encode means further includes a secondary counter means for effectively bypassing said second storage means and stepping through a particular field on the document in response to the printing field selector key corresponding to said particular field on the document having been left in the normal position, thereby indicating that said particular field was not to be encoded and effectively encoding blanks therein.

8. In a document encoder, for encoding a plurality of data fields in line on a document, a printing field control system comprising:

a keyboard having a plurality of data keys for receiving data to be encoded and at least one operational key for initiating the control system, a memory having a plurality of individually addressable storage registers each having a plurality of digit locations, said memory operatively coupled to said keyboard for receiving the data entered therein, a plurality of operator-controlled program keys adjacent said keyboard, said program keys having a normal position and a selected position, said program keys respectively coupled to corresponding ones of said storage registers for addressing said storage registers in response to the activation of said operational key and the selected position of said program keys, a program controller operatively coupled to said program keys for individually activating said selected program keys in a predetermined sequence in response to the activation of said operational key, a comparator responsive to both said selected program key and said program controller for generating an electrical signal when said status of said controller is equivalent to said selected program key, control means responsive to said electrical signal from said comparator and said selected program key for controlling the flow of data into said corresponding storage register from said keyboard, and an encode member responsive to said selected program keys for serially encoding on the document the data stored in said storage registers corresponding to said selected program keys.

9. In a document encoder according to claim 8 further including an instruction register having a plurality of storage members respectively responsive to said operator-controlled program keys and operatively coupled to said encode member for controlling the printing of the data contained in said selected memory storage register according to a predetermined encoding sequence.

10. In a document encoder according to claim 9 further including a symbol control unit responsive to said instruction register for encoding predetermined symbol data at predetermined digit locations of said corresponding storage registers overriding the data stored therein.

* * * * *

PO-1050
(5/69)

UNITED STATES PATENT OFFICE
CERTIFICATE OF CORRECTION

Patent No. 3,768,078 Dated 10/23/73

Inventor(s) Richard M. Williams

It is certified that error appears in the above-identified patent and that said Letters Patent are hereby corrected as shown below:

The name of the assignee, Burroughs Corporation, should appear in the Abstract section of the issued patent.

Col. 4, line 40, change "didit" to --digit--.
Col. 8, line 55, "F." should read -- FO --.
Col. 10, line 8, should read --MBR ≠ RT--.
Col. 10, line 13, change "true" to --three--.

Signed and sealed this 11th day of June 1974.

SEAL)
ttest:

EDWARD M.FLETCHER,JR.
ttesting Officer

C. MARSHALL DANN
Commissioner of Patents